United States Patent
Bogane

(10) Patent No.: US 9,610,643 B2
(45) Date of Patent: Apr. 4, 2017

(54) COMBUSTOR ASSEMBLY FOR A GAS TURBINE ENGINE HAVING A BRAZE LAYER HAVING A CENTERLINE EUTECTIC FREE REGION

(71) Applicant: SOLAR TURBINES INCORPORATED, San Diego, CA (US)

(72) Inventor: William Corey Bogane, El Cajon, CA (US)

(73) Assignee: Solar Turbines Incorporated, San Diego, CA (US)

( * ) Notice: Subject to any disclaimer, the term of this patent is extended or adjusted under 35 U.S.C. 154(b) by 404 days.

(21) Appl. No.: 14/293,225

(22) Filed: Jun. 2, 2014

(65) Prior Publication Data

US 2015/0343545 A1    Dec. 3, 2015

(51) Int. Cl.
| | | |
|---|---|---|
| B23K 1/19 | (2006.01) | |
| B23K 1/00 | (2006.01) | |
| F02C 7/22 | (2006.01) | |
| F23R 3/28 | (2006.01) | |

(52) U.S. Cl.
CPC ............ B23K 1/0008 (2013.01); B23K 1/19 (2013.01); F02C 7/22 (2013.01); F23R 3/28 (2013.01); *F23R 2900/00018* (2013.01); *Y10T 403/479* (2015.01)

(58) Field of Classification Search
CPC ...... B23K 1/0018; B23K 1/0008; B23K 1/19; Y10T 29/4932; B23P 15/008; B23P 15/00; F23R 2900/00018
USPC ................ 228/119, 182, 244–262, 233.3, 228/262.3–262.31
See application file for complete search history.

(56) References Cited

U.S. PATENT DOCUMENTS

| | | | |
|---|---|---|---|
| 4,152,816 A * | 5/1979 | Ewing | B22F 7/062 228/104 |
| 6,112,971 A | 9/2000 | Castaldo et al. | |
| 6,434,946 B1 | 8/2002 | Shaw et al. | |
| 6,877,651 B2 * | 4/2005 | Sandin | B23K 35/3033 228/121 |
| 7,318,547 B2 * | 1/2008 | Gasse | B23K 1/19 228/194 |
| 7,658,315 B2 | 2/2010 | Budinger et al. | |
| 8,356,409 B2 | 1/2013 | Perret | |

(Continued)

OTHER PUBLICATIONS

Pouranvari, M., Diffusion Brazing of a Nickel Based Superalloy Part 1—Solidification Behavior, Jul. 12, 2010, MJoM, 16(4), pp. 241-247.

*Primary Examiner* — Jason L Vaughan
*Assistant Examiner* — Amanda Meneghini
(74) *Attorney, Agent, or Firm* — Procopio, Cory, Hargreaves & Savitch, LLP

(57) ABSTRACT

A fuel injector for a combustor assembly for a gas turbine engine is disclosed. The fuel injector includes a first component, a second component, and a braze layer. The first component has a sidewall. The second component also has a sidewall. The braze layer is formed between the sidewall of the first component and the sidewall of the second component. The braze layer is being formed from a Nickel (Ni) alloy brazing material containing non-metallic constituents. The braze layer also has a eutectic-free region with substantially all of the non-metallic constituents diffused away from a centerline area between the first component and the second component.

8 Claims, 5 Drawing Sheets

(56) References Cited

U.S. PATENT DOCUMENTS

| | | |
|---|---|---|
| 8,555,500 B2 | 10/2013 | Vossberg et al. |
| 2005/0040210 A1 | 2/2005 | Sandin |
| 2007/0039177 A1 | 2/2007 | Yoshioka et al. |
| 2007/0154338 A1 | 7/2007 | Sathian et al. |
| 2007/0199977 A1 | 8/2007 | Pollard et al. |
| 2012/0063911 A1 | 3/2012 | Bossmann et al. |
| 2013/0020377 A1 | 1/2013 | Stankowski et al. |
| 2013/0084467 A1 | 4/2013 | Sjdin |
| 2013/0284825 A1 | 10/2013 | Prue et al. |

* cited by examiner

COMBUSTOR ASSEMBLY FOR A GAS TURBINE ENGINE HAVING A BRAZE LAYER HAVING A CENTERLINE EUTECTIC FREE REGION

TECHNICAL FIELD

The present disclosure generally pertains to gas turbine engines, and is more particularly directed to brazing layers used to assemble the fuel injectors, which attach to the combustor assembly.

BACKGROUND

Gas turbine engines include compressor, combustor, and turbine sections. The combustor includes a fuel injector having one or more subcomponents brazed together. The brazed components of the fuel injector must withstand both thermal and mechanical stresses during the operation of the gas turbine engine.

U.S. Patent App. Pre-Grant Publication No. 2007/00391777 to Y. Yoshoka discloses a method of regenerating a gas-turbine stator vane including grinding the oxidized layer and the cracks formed at surface portion so that a part of the cracks remains. The method also includes filling an equivalent material and a brazing material into the ground portion. The equivalent material has bonded with the base material for the stator vane. The brazing material has a melting point lower than that of the equivalent material. The method also includes heat treating the filled portion under pressurized inert gas atmosphere so as to melt the brazing material. The method further includes performing brazing treatment by diffusing the molten brazing material into the cracked portions.

The present disclosure is directed toward overcoming one or more of the problems discovered by the inventors or that is known in the art.

SUMMARY OF THE DISCLOSURE

In one embodiment, a fuel injector for a combustor assembly for a gas turbine engine is disclosed. The fuel injector includes a first component, a second component, and a braze layer. The first component has a sidewall. The second component also has a sidewall. The braze layer is formed between the sidewall of the first component and the sidewall of the second component. The braze layer is being formed from a Nickel (Ni) alloy brazing material containing non-metallic constituents. The braze layer also has a eutectic-free region with substantially all of the non-metallic constituents diffused away from a centerline area between the first component and the second component.

In another embodiment, another fuel injector for a combustor assembly for a gas turbine engine is disclosed. The fuel injector includes a first component, a second component, and a braze layer. The first component has a sidewall. The second component also has a sidewall. The braze layer is formed between the sidewall of the first component and the sidewall of the second component. The braze layer is formed from a Nickel (Ni) alloy brazing material containing non-metallic constituents. The braze layer is formed by a brazing process. The brazing process includes heating the brazing material to a first temperature above a liquidus temperature of the brazing material. The brazing process also includes maintaining the brazing material at the first temperature for at least 10 minutes. The brazing process further includes cooling the brazing material to a second temperature below a solidus temperature of the brazing material, at a controlled rate over a period of at least 5 minutes. The brazing process additionally includes maintaining the brazing material at the second temperature for a period of at least 30 minutes. The brazing process also includes heating the brazing material to a third temperature above the liquidus temperature of the brazing material at a controlled rate over a period of at least 5 minutes, wherein the third temperature is below the first temperature. Additionally, the brazing process includes maintaining the brazing material at the third temperature for a period of time of at least 30 minutes. Further, the brazing process includes cooling the brazing material to a fourth temperature above the solidus temperature of the brazing material and below the liquidus temperature at a controlled rate over at least 3 minutes.

In another embodiment, a method for brazing a part of a gas turbine engine is disclosed. The method includes applying a braze layer formed from a Nickel (Ni) alloy brazing material containing non-metallic constituents to the part. The method also includes heating the brazing material to a first temperature above the liquidus temperature of the brazing material. The method further includes maintaining the brazing material at the first temperature for a first period of time sufficient to allow the brazing material to liquefy and wick between into a braze joint. The method additionally includes cooling the brazing material to a second temperature below the solidus temperature of the brazing material, at a controlled rate over a second period of time sufficient to prevent warping of the part due to thermal inertia. The method also includes maintaining the brazing material at the second temperature for a third period of time sufficient to diffuse a portion of the non-metallic constituents away from a centerline area of the braze joint. The method additionally includes heating the brazing material to a third temperature above the liquidus temperature of the brazing material at a controlled rate over a fourth period sufficient to prevent warping of the part due to thermal inertia, wherein the third temperature is below the first temperature. Further, the method includes maintaining the brazing material at the third temperature for a fifth period of time sufficient to produce a centerline area of the braze joint substantially free of non-metallic constituents. Additionally, the method includes cooling the brazing material to a fourth temperature above the solidus temperature of the brazing material and below the liquidus temperature at a controlled rate over a sixth period of time sufficient to prevent warping of the part due to thermal inertia.

DETAILED DESCRIPTION

The systems and methods disclosed herein include a fuel injector including at least two sub-components with a braze layer between the two subcomponents. In embodiments, braze layer is formed from Nickel Alloy brazing material containing non-metallic constituents. The braze layer has eutectic-free region having no non-metallic constituents along the center line between the subcomponents of the fuel injector. The eutectic-free region may reduce or prevent cracking of the braze layer during operation of the gas turbine engine.

Figure 1:
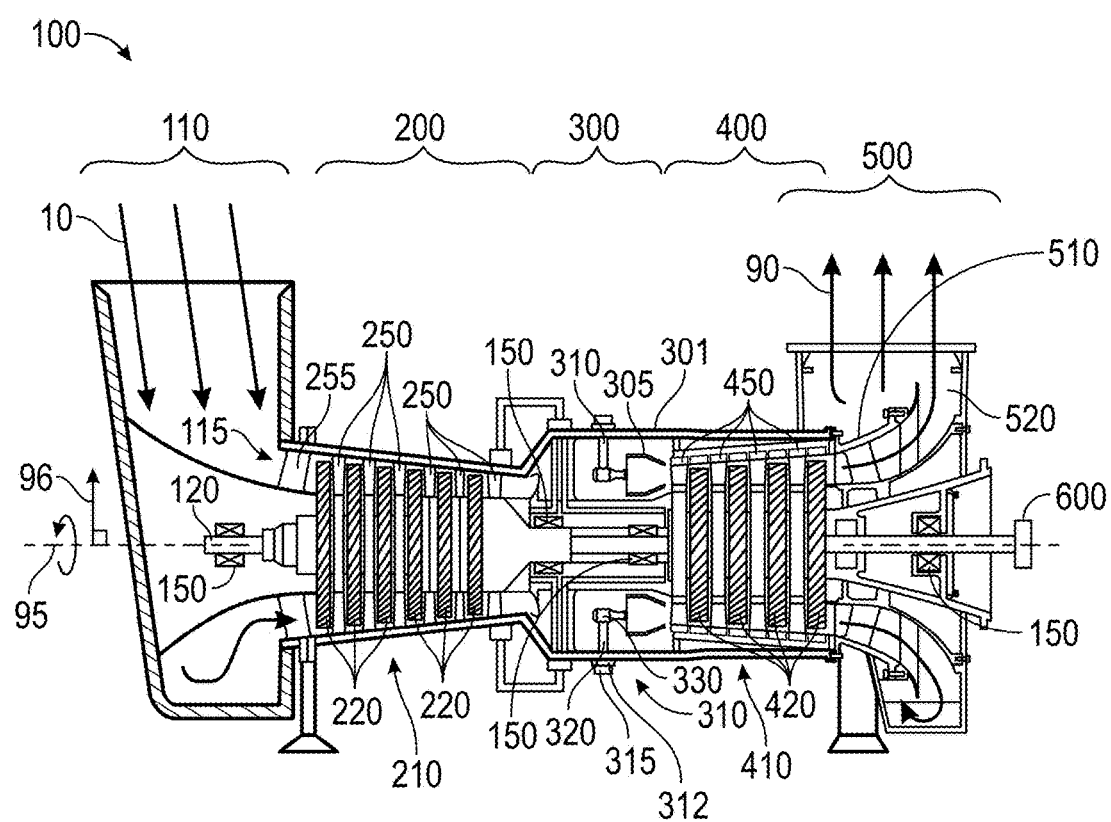
FIG. 1 is a schematic illustration of an exemplary gas turbine engine.

FIG. 1 is a schematic illustration of an exemplary gas turbine engine 100. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from center axis 95, wherein a radial 96 may be in any direction perpendicular and radiating outward from center axis 95.

A gas turbine engine 100 includes an inlet 110, a shaft 120, a compressor 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes (stators) 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes one or more combustion chambers 305, one or more fuel injectors 310, and a combustor case 301 located radially outward from the combustion chamber 305. Each fuel injector 310 has a number of components and subcomponents including a barrel assembly 330 adjacent a combustion chamber 305, a flange 312 adjacent the combustor case 301, a fitting boss 315 protruding from the flange 312, and a stem 320 extending from the flange 312 in the direction opposite fitting boss 315, between the fitting boss 315 and the barrel assembly 330. Each of the barrel assembly 330, fitting boss 315, stem 320 may include a braze layer as discussed below with respect to FIGS. 3 and 4.

The turbine 400 includes a turbine rotor assembly 410 and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades 430. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages.

The exhaust 500 includes an exhaust diffuser 510 and an exhaust collector 520. The power output coupling 600 may be located at an end of shaft 120.

Figure 2:
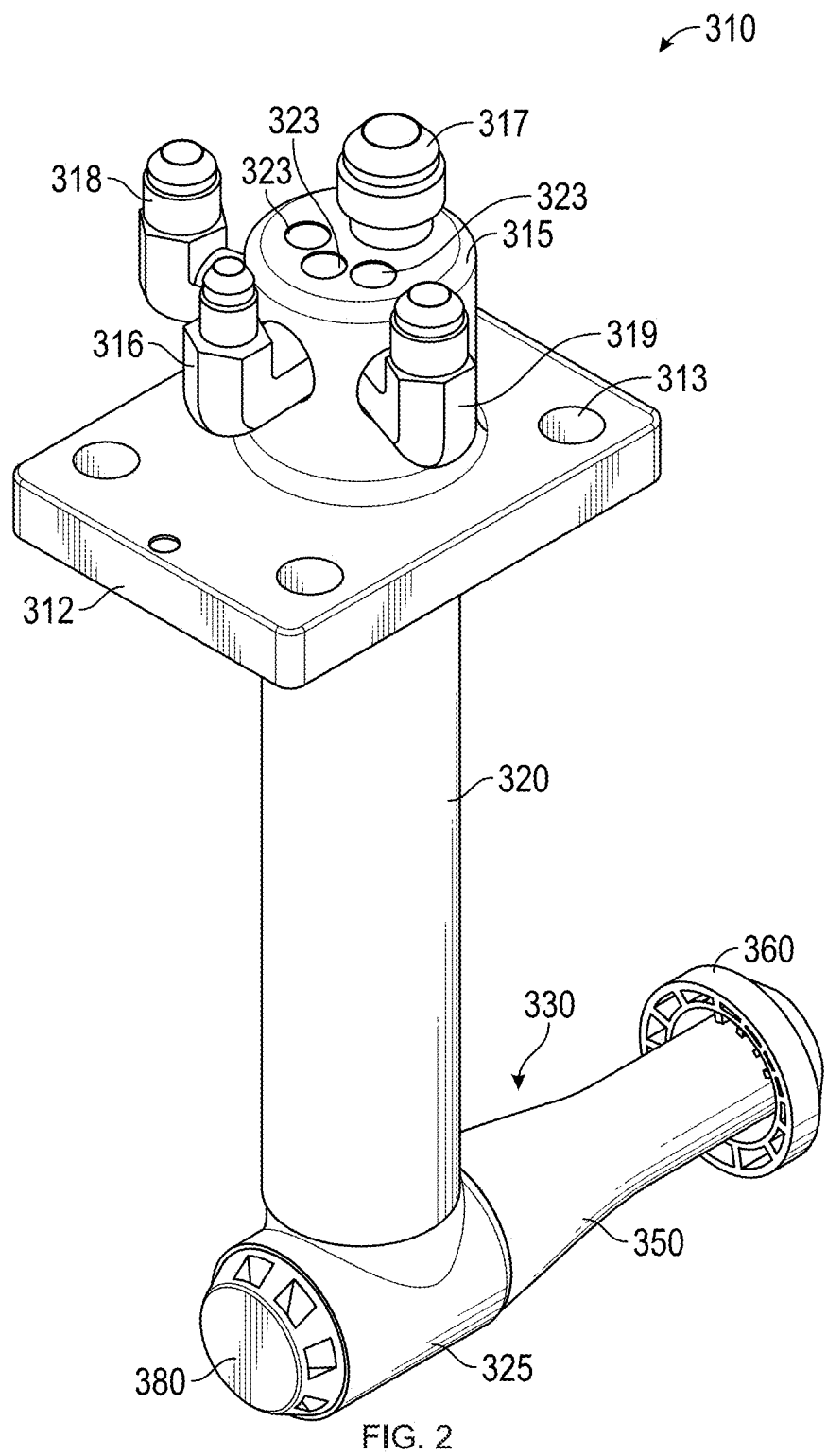
FIG. 2 is a perspective view of a fuel injector for the combustor of FIG. 1.

FIG. 2 is a perspective view of a fuel injector 310 for the combustor 300 of FIG. 1. Referring to FIG. 2, fitting boss 315, flange 312, and stem 320 may be an integral piece. Fitting boss 315 may include a cylindrical or prism shape extending from flange 312. Multiple fittings may be coupled to fitting boss 315. Liquid fuel, gas fuel, and air supply lines may be coupled to the fittings to supply liquid fuel, gas fuel, and air to the fuel injector 310. In the embodiment illustrated in FIG. 2, a liquid fuel fitting 316 is coupled to the side of fitting boss 315 and a gas fuel fitting 317 is coupled to the top surface of fitting boss 315. In the embodiment shown, fittings 318 and 319 are also coupled to the side of fitting boss 315. Fittings 318 and 319 may be used for liquid or gas pilot fuel supply or may be used to supply air. A braze layer may be provided at the joint between each of the fittings (316, 317, 318, 319) and the fitting boss 315 as discussed below with respect to FIG. 4.

Figure 3:
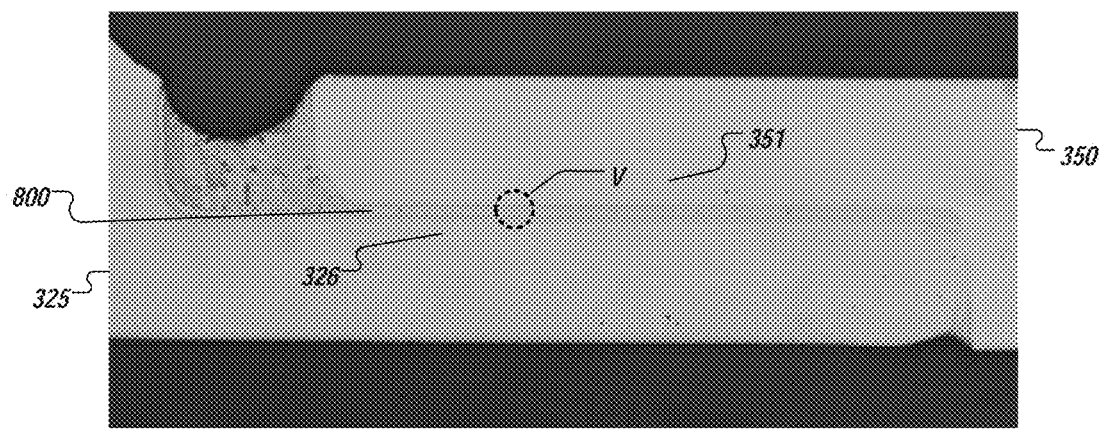
FIG. 3 is a micrograph of a cross-section of a braze joint of a barrel assembly of the fuel injector of FIG. 1.

Flange 312 may include a circular or polygonal shape. In the embodiment shown in FIG. 2, flange 312 includes a rectangular shape. Flange 312 includes multiple mounting holes 313. Mounting holes 313 may be used to affix fuel injector 310 to combustor case 301. Referring to FIGS. 2 and 3, fuel injector 310 may include a gallery portion 325. Gallery portion 325 may include a hollow cylinder shape and may be located at an end of stem 320, opposite and distal to flange 312. Gallery portion 325 may be an integral piece and may be machined or molded with fitting boss 315, flange 312, and stem 320.

Stem 320 may include a hollow cylinder shape and may one or more passages extending from fitting boss 315 to gallery portion 325. Each passage may be machined or drilled from the top of fitting boss 315 to the gallery portion 325. A fitting, such as gas fuel fitting 317 or a cap 323 may be placed or inserted at the end of each passage at fitting boss 315. These passages may supply liquid and gas pilot fuel or air to the barrel assembly 330.

The barrel assembly 330 and gallery portion 325 may share a common axis. All references to radial, axial, and circumferential directions and measures relating to barrel assembly 330 and gallery portion 325.

Barrel assembly 330 may include swirler assembly 350, outlet swirler 360, and inlet swirler 380. Swirler assembly 350 may be formed by a single piece or multiple pieces metallurgically bonded together by brazing or welding. Additionally, the gallery portion 325 and the swirler assembly 350 may be metallurgically bonded together, such as by brazed or welding.

FIG. 3 is a micrograph of a cross-section of a braze joint of a barrel assembly 330 of the fuel injector 310 of FIG. 1.

As illustrated the joint is formed between a side wall 326 of a portion of the galley portion 325 and a sidewall 351 of a portion of the swirler assembly 350. A layer of brazing material 800 is applied between the sidewall 326 and the sidewall 351 to metallurgically bond the two sidewalls 326, 351 together. FIG. 3 illustrates the layer of brazing material 800 after brazing between the galley portion 325 and the swirler assembly 350. However, embodiments of the present application are not limited to having the brazing material 800 applied to this location. In other embodiments, the layer of brazing material 800 may be formed between other portions of the barrel assembly 330 and/or may also be applied to other components or subcomponents of the fuel injector 310.

Figure 4:
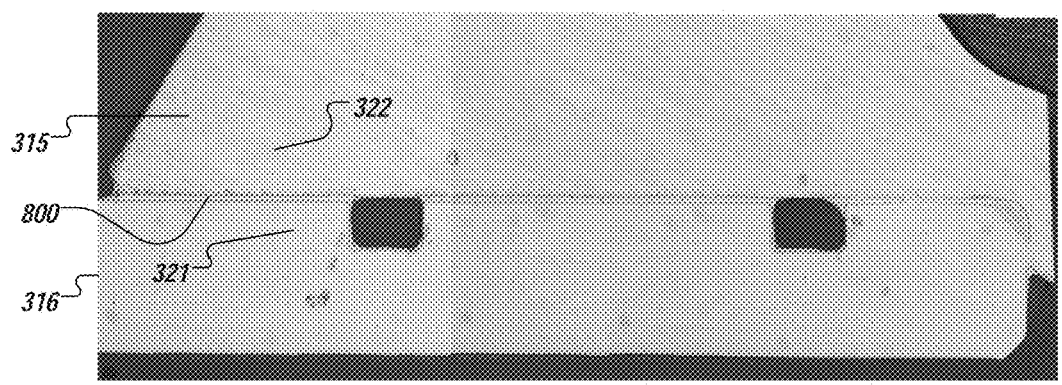
FIG. 4 is a micrograph of a cross-section of a braze joint of a fitting of the fuel injector of FIG. 1.

FIG. 4 is a micrograph of a cross-section of a braze joint of a fitting 316 of the fuel injector 310 of FIG. 1. As illustrated the joint is formed between a side wall 321 of a portion of the fitting 316 and a sidewall 322 of a portion of fitting boss 315. A layer of brazing material 800 is applied between the sidewall 321 and the sidewall 322 to metallurgically bond the two sidewalls 321, 322 together. FIG. 4 illustrates the layer of brazing material 800 applied between the fitting 316 and the fitting boss 315, embodiments of the present application are not limited to having the brazing material 800 applied to this location. In other embodiments, the layer of brazing material 800 may be applied between other components or subcomponents of the fuel injector 310.

Figure 5:
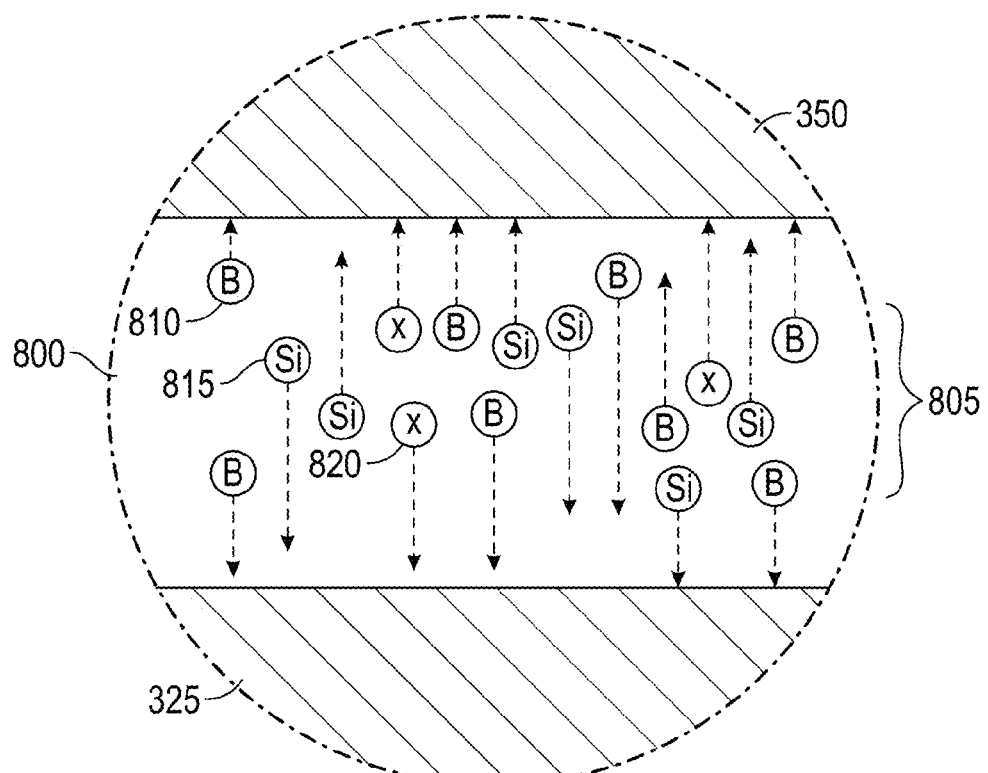
FIG. 5 is an enlarged illustration a portion, V, of the brazing material of the brazing layer identified in FIG. 3 during a brazing process.

FIG. 5 is an enlarged illustration of a portion, V, of the brazing material 800 of the brazing layer identified in FIG. 3 during a brazing process. The brazing material 800 may be a nickel (Ni) alloy brazing material. In some embodiments, the brazing material 800 may be an alloy containing Nickel, Iron (Fe), and Chromium (Cr). Additionally, the brazing material 800 may also include non-metallic constituents (810, 815, 820). For example, in some embodiments the brazing material 800 may contain particles of Silicon (Si) 810, Boron (B) 815, and, in some embodiments may also contain miscellaneous impurities (such as carbon, phosphorus, sulfur, etc.; represented herein by "X") 820. In some embodiments, the brazing material 800 may be AMS 4777 brazing material generally has a composition of 82.4% Ni, 3% Fe, 7% Cr, 3.1% B, and 4.5% Si. However, AMS 4777 brazing material composition may vary, due to manufacturing discrepancies, within the following ranges: Ni—(80-84.75%), Fe—(2.5-3.5%), Cr—(6-8%), B—(2.75-3.5%), Si—(4-5%). AMS 4777 brazing material has a recommended brazing temperature range between 1850° F.-2150° F. AMS 4777 brazing material 800 also has a solidus temperature (the temperature below which a given substance is completely solid) of 1780° F. and a liquidus temperature (temperature above which a material is completely liquid) of 1830° F. Other brazing materials may have different brazing temperature ranges and different solidus/liquidus temperatures.

As illustrated in FIG. 5, the brazing material 800 has a matrix of non-metallic constituents 810, 815, 820 distributed throughout, including a centerline region 805 between the gallery portion 325 and the swirler assembly 350. The presence of the non-metallic constituents 810, 815, 820 in the centerline region 805 may be referred to as a centerline eutectic region.

Figure 6:
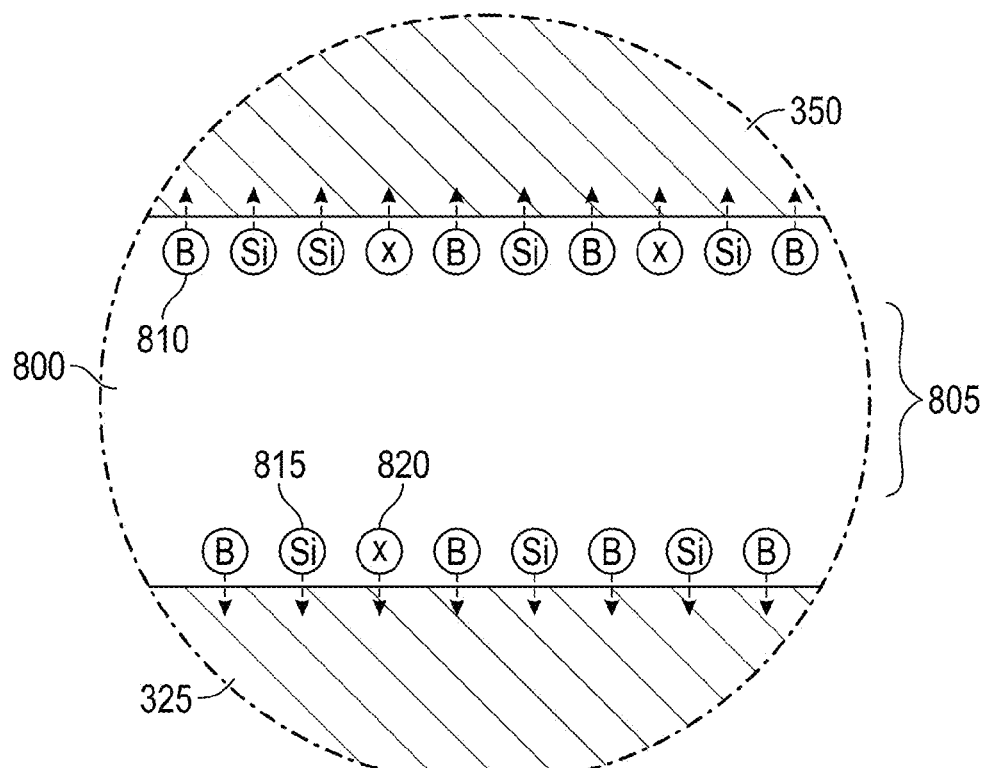
FIG. 6 is an enlarged illustration of portion V of the brazing material of the brazing layer identified in FIG. 3 with the non-metallic constituents being diffused out of the centerline region during a brazing process according to an embodiment.

FIG. 6 is an enlarged illustration of portion V of the brazing material 800 of the brazing layer identified in FIG. 3 with the non-metallic constituents 810, 815, 820 being diffused out of the centerline region 805 during a brazing process according to an embodiment of the present application. As illustrated, the non-metallic constituents 810, 815, 820 have diffused toward the edges of the brazing material 800 and are diffusing into the gallery portion 325 and the swirler assembly 350, producing a centerline region 805 substantially free from non-metallic constituents 810, 815, 820. In some embodiments, the non-metallic constituents 810, 815, 820 will diffuse completely out of the brazing material 800 and into the gallery portion 325 and the swirler assembly 350.

As illustrated in FIG. 5, an embodiment of the brazing material 800 may be completely free of non-metallic constituents 810, 815, 820 along the centerline region 805. However, other embodiments of the brazing material 800 may have a substantial reduction in the presence of non-metallic constituents 810, 815, 820 of the brazing material 800 pre- and post-brazing due to diffusion of the non-metallic constituents 810, 815, 820. Diffusion of substantially all of non-metallic constituents away from the centerline region 805 may be considered "substantially free" of non-metallic constituents and may be referred to as a eutectic-free region.

In some embodiments, diffusion of substantially all of the non-metallic constituents away from the centerline region 805 may produce a substantial reduction of at least 50% from an initial, pre-brazing value ($\alpha_i$) to a post brazing value ($\alpha_f$) (i.e. $\alpha_f$=50% $\alpha_i$). With respect to AMS 4777 brazing material, the pre-brazing value ($\alpha_i$) of the non-metallic constituents is generally be in a range of 6.75-8.5% of the total material weight. Thus, a reduction of at least 50% would mean that the weight of non-metallic constituents 810, 815, 820 present would be in a range of 0-4.25% of the total material weight.

The specific percentage reduction that may be considered sufficient may vary based on the design requirements of the brazed joint. In some embodiments, a reduction of at least 90% may be required to be deemed a substantial reduction (i.e. $\alpha_f$=90% $\alpha_i$). Again, with respect to AMS 4777, a 90% reduction would mean that the weight of non-metallic constituents present would be in a range of 0-0.85% of the total weight Of course, a complete reduction ((i.e. $\alpha_f$=0) may achieved using an embodiment of the present application.

The above embodiments illustrate braze layers between the gallery portion 325 and the swirler assembly 350 and between the liquid fuel fitting 316 and the fitting boss 315. However, various other components or sub-components of each fuel injector 310, may also be metallurgically using a brazing layer has described herein.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, alloy x, INCONEL, WASPALOY, RENE alloys, HAYNES alloys, alloy 188, alloy 230, INCOLOY, MP98T, TMS alloys, and CMSX single crystal alloys.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Air 10 and fuel are injected into the combustion chamber 305 via fuel injector 310 and combusted. Energy is extracted from the combustion reaction via the turbine 400 by each stage of the series of turbine disk assemblies 420. Exhaust gas 90 may then be diffused in exhaust diffuser 510, collected and redirected. Exhaust gas 90 exits the system via an exhaust collector 520 and may be further processed (e.g., to reduce harmful emissions, and/or to recover heat from the exhaust gas 90).

With reference to FIG. 5, the presence of non-metallic constituents 810, 815, 820 in the centerline region 805 forms the centerline eutectic region illustrated. If the brazing material 800 is allowed to cool below the brazing range of the brazing material 800 with the centerline eutectic region still present, the centerline eutectic region can be a brittle matrix susceptible to cracking when subject to mechanical loads and/or vibration. Conversely, with reference to FIG. 6, a centerline region 805 free or substantially free of non-metallic constituents 810, 815, 820 may allow the brazing material 800 more ductility with less crack formation sensitivity after cooling below the brazing range of the brazing material 800. A centerline region 805 may be considered substantially free of non-metallic constituents 810, 815, 820 when there is a substantial reduction in the presence of non-metallic constituents 810, 815, 820 along the center line of the braze joint between when the brazing material is initially applied and the brazing process has been completed. In some embodiments, a substantial reduction in the presence of non-metallic constituents 810, 815, 820 may be achieved if the presence of non-metallic constituents is reduced by at least 50% from an initial, pre-brazing value ($\alpha_i$) to a post brazing value ($\alpha_f$) (i.e. $\alpha_f$=50% $\alpha_i$). With respect to AMS 4777 brazing material, the pre-brazing value ($\alpha_i$) of the non-metallic constituents may generally be in a range of 6.75-8.5% of the total material weight. Thus, a reduction of at least 50% would mean that the weight of non-metallic constituents present would be in a range of 0-4.25% of the total material weight.

The specific percentage reduction that may be considered sufficient may vary based on the design requirements of the brazed joint. In some embodiments, a reduction of at least 90% may be required to be deemed a substantial reduction (i.e. $\alpha_f$=90% $\alpha_i$). Again, with respect to AMS 4777, a 90% reduction would mean that the weight of non-metallic constituents present would be in a range of 0-0.85% of the total weight Of course, a complete reduction ((i.e. $\alpha_f$=0) may achieved using an embodiment of the present application.

Figure 7:
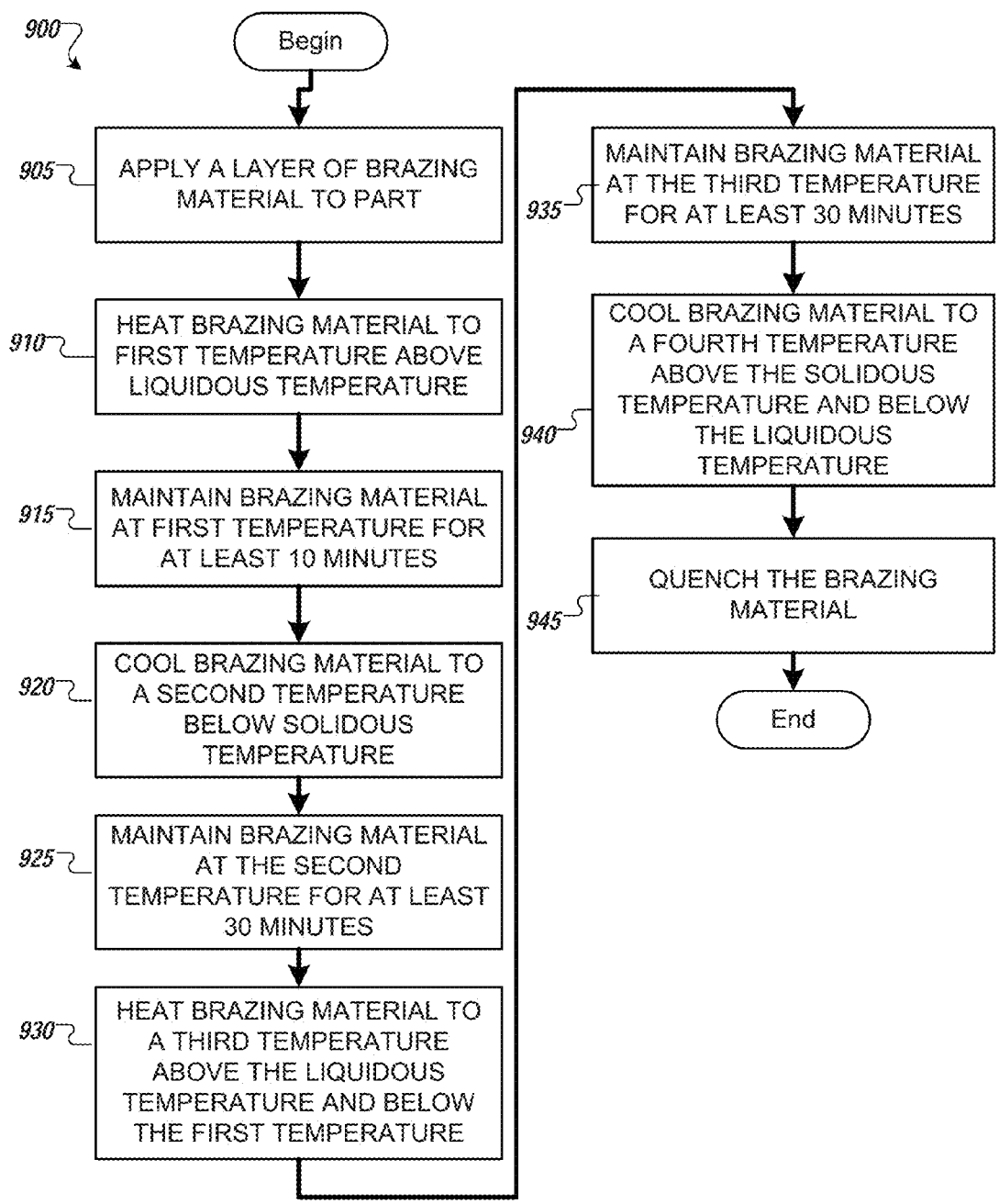
FIG. 7 is a flow chart of a method for brazing a part of a fuel injector in a gas turbine engine.

FIG. 7 is a flow chart of a process 900 of brazing a part of a fuel injector 310 in a gas turbine engine 100. The following discussion is made with reference to brazing a first component of a barrel assembly 330 to a second component of a barrel assembly 330. However, embodiments of the process 900 may also be applied to other components of the fuel injector 310 and may also be applied to parts of the gas turbine engine 100 other than the fuel injectors 310, as may be apparent to a person of ordinary skill in the art.

In step 905, the brazing material 800 is applied to the sidewalls 326, 351 of the components to be brazed together. In some embodiments, the sidewalls 326, 351 may be chemically or mechanically cleaned prior to application of the brazing material 800. As illustrated in FIG. 3, the brazing material 800 may be applied to one or more of the sidewall 351 of the swirler assembly 350 and the sidewall 326 of the gallery portion 325.

The method of application is not particularly limited and may include the brazing material 800 being applied in the form of rods, ribbons, powder, paste, cream, wire, preform, foil, tape or any other method of application as may be apparent to a person of ordinary skill in the art. After the brazing material 800 has been applied to the sidewalls 326, 351, the sidewalls 326, 351 may be fixed in close proximity to each other.

After the brazing material 800 is applied to sidewalls 326, 351, the brazing material 800 and sidewalls 326, 351 are heated to a first temperature above the liquidus temperature of the brazing material 800 in step 910. For example, when AMS 4777 brazing material is used, the first temperature may be in range of 1935° F.-1965° F., well above the liquidus temperature of AMS 4777 (1830° F.). Further, in some embodiments, the first temperature may be 1950° F.

The heating of the brazing material 800 may be performed in a brazing oven or brazing furnace. However, the heating of the brazing material 800 may also be performed using any other heating techniques as may be apparent to a person of ordinary skill in the art. Additionally, in some embodiments, the heating of the brazing material 800 may be performed under partial or full vacuum conditions.

The heating of the brazing material 800 may be performed at a controlled rate over a period of time to prevent cracking, bending, or warping of the components being brazed due to thermal inertia. As should be apparent to a person of ordinary skill in the art, if the component is heated too quickly, portions of the component may heat unevenly causing cracking, bending or warping of the component. For example, in some embodiments, the heating of the brazing material 800 may be performed at a rate of 30° F./min. In other embodiments, the heating of the brazing material 800 may be performed at a rate of 40° F./min. In some embodiments, the heating of the brazing material 800 may be performed in 2 or more stages. For example, the brazing material 800 may be heated to a temperature (such as 1750° F.) near and below the solidus temperature of the brazing material 800 at a rate of 30° F./min, then held at the temperature near and below the solidus temperature for a period of time (such as 5 minutes), and the heated to the first temperature (such as 1950° F.) at a rate of 40° F./min.

Once the brazing material 800 has been heated to the first temperature, the brazing material 800 may be maintained at the first temperature for a first period of time sufficient to allow the brazing material to liquefy and wick between the sidewalls 336, 351 in step 915. In some embodiments, the first period of time may be at least 10 minutes in step 915. For example, in some embodiments, the brazing material 800 may be held at a temperature in the range in range of 1935° F.-1965° F. for at least 10 minutes. In other embodiments, the brazing material 800 may be held at 1950° F. for at least 12 minutes.

Once the brazing material 800 has been maintained at the first temperature, the brazing material 800 is cooled to a second temperature below the solidus temperature of the brazing material 800 in step 920. For example, when AMS 4777 brazing material is used, the second temperature may be in range of 1735° F.-1765° F., below the solidus temperature of AMS 4777 (1780° F.). Further, in some embodiments, the second temperature may be 1750° F. In some embodiments, the second temperature may be the same temperature near and below the solidus temperature used in a two-step heating process discussed above with respect to step 910.

The cooling of the brazing material 800 may be performed in the brazing oven or brazing furnace. However, the cooling of the brazing material 800 may also be performed using any other techniques as may be apparent to a person of ordinary skill in the art. Additionally, in some embodiments, the cooling of the brazing material 800 may be performed under partial or full vacuum conditions.

The cooling of the brazing material 800 may be performed at a controlled rate over a second period of time sufficient to prevent cracking, bending, or warping of the components being brazed due to thermal inertia. As should be apparent to a person of ordinary skill in the art, if the component is cooled too quickly, portions of the component may cool unevenly causing cracking, bending or warping of the component. For example, in some embodiments, the cooling of the brazing material 800 may be performed at a rate of 30° F./min for a period of at least 5 minutes. In other embodiments, the cooling of the brazing material 800 may be performed at other rates such as 40° F./min, or any other rate that may be apparent to a person of ordinary skill in the art. In some embodiments, the cooling of the brazing material 800 may be performed in 2 or more stages.

Once the brazing material 800 has been cooled to the second temperature, the brazing material 800 may be maintained at the second temperature for a third period of time sufficient to diffuse a portion of the non-metallic constituents away from a centerline of the braze joint in step 925. In some embodiments, the third period of time may be at least 30 minutes in step 925. For example, in some embodiments, the brazing material 800 may be held at a temperature in the range in range of 1735° F.-1765° F. for at least 30 minutes. In other embodiments, the brazing material 800 may be held at 1750° F. for at least 60 minutes.

Once the brazing material 800 has been maintained at the second temperature, the brazing material 800 are heated to a third temperature above the liquidus temperature of the brazing material 800 and below the first temperature in step 930. For example, when AMS 4777 brazing material is used, the second temperature may be in range of 1910° F.-1940° F., above the liquidus temperature of AMS 4777 (1830° F.) and below the first temperature in the range 1935° F.-1965° F. Further, in some embodiments, the third temperature may be 1925° F.

The heating of the brazing material 800 may be performed in a brazing oven or brazing furnace. However, the heating of the brazing material 800 may also be performed using any other heating techniques as may be apparent to a person of ordinary skill in the art. Additionally, in some embodiments, the heating of the brazing material 800 may be performed under partial or full vacuum conditions.

The heating of the brazing material 800 may be performed at a controlled rate over a fourth period of time sufficient to prevent cracking, bending, or warping of the components being brazed due to thermal inertia. As should be apparent to a person of ordinary skill in the art, if the component is heated too quickly, portions of the component may heat unevenly causing cracking, bending or warping of the component. For example, in some embodiments, the heating of the brazing material 800 may be performed at a rate of 30° F./min for a period of at least 5 minutes. In other embodiments, the heating of the brazing material 800 may be performed at other rates such as 40° F./min, or any other rate that may be apparent to a person of ordinary skill in the art. In some embodiments, the heating of the brazing material 800 may be performed in 2 or more stages.

Once the brazing material 800 has been heated to the third temperature, the brazing material 800 may be maintained at the third temperature for a fifth period of time sufficient to produce a centerline area of the braze joint substantially free of non-metallic constituents in step 935. In some embodiments, the fifth period of time may be at least 10 minutes in step 935. For example, in some embodiments, the brazing material 800 may be held at a temperature in the range in range of 1910° F.-1940° F. for at least 30 minutes. In other embodiments, the brazing material 800 may be held at 1925° F. for at least 60 minutes.

Once the brazing material 800 has been maintained at the third temperature, the brazing material 800 is cooled to a fourth temperature above the solidus temperature and below the liquidus temperature of the brazing material 800 in step 940. For example, when AMS 4777 brazing material is used, the fourth temperature may be in range of 1785° F.-1815° F. Further, in some embodiments, the fourth temperature may be 1800° F.

The cooling of the brazing material 800 may be performed in the brazing oven or brazing furnace. However, the cooling of the brazing material 800 may also be performed using any other techniques as may be apparent to a person of ordinary skill in the art. Additionally, in some embodiments, the cooling of the brazing material 800 may be performed under partial or full vacuum conditions.

The cooling of the brazing material 800 may be performed at a controlled rate over a sixth period of time sufficient to prevent cracking, bending, or warping of the components being brazed due to thermal inertia. As should be apparent to a person of ordinary skill in the art, if the component is cooled too quickly, portions of the component may cool unevenly causing cracking, bending or warping of the component. For example, in some embodiments, the cooling of the brazing material 800 may be performed at a rate of 30° F./min for a period of at least 3 minutes. In other embodiments, the cooling of the brazing material 800 may be performed at other rates such as 40° F./min, or any other rate that may be apparent to a person of ordinary skill in the art. In some embodiments, the cooling of the brazing material 800 may be performed in 2 or more stages.

Once the brazing material 800 has been cooled to the fourth temperature, the brazing material 800 may be quenched to cool the brazing material 800 to a temperature below the brazing range of the brazing material 800 in step 945. In some embodiments, the quenching of the brazing material 800 may an argon quenching process. Other quenching methods may be used as may be apparent to a person of ordinary skill in the art. In some embodiments, the quenching may be performed until the brazing material 800 is below 200° F.

By brazing components of a fuel injector using a process according to an embodiment of the present application, a braze layer having a centerline region 805 substantially free of non-metallic constituents 810, 815, 820 may be produced, such as that illustrated in FIG. 6. By producing a centerline region 805 free of non-metallic constituents 810, 815, 820, a centerline eutectic matrix may be prevented and a more ductile braze joint may be produced. A more ductile braze joint may be less susceptible to cracking due to mechanical loads and/or vibration and may last longer without failure requiring repair or replacement.

Existing brazing methods have been unable to consistently produce a centerline region 805 substantially free of non-metallic constituents 810, 815, 820 due to insufficient diffusion of the non-metallic constituents within the braze material 800. With a centerline region 805 substantially free of non-metallic constituents 810, 815, 820, the braze material 800 of the braze layer can have improved ductility and is less susceptible to cracking. Additionally, the melt point of the braze material 800 of the braze layer may be significantly raised because the non-metallic constituents, which lower the melt point, diffused out of the centerline region, other parts of the component can be brazed in a subsequent brazing process without risk of re-melting the braze material 800 of the braze layer.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular fuel injector, it will be appreciated that the fuel injector in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A method for brazing a part of a gas turbine engine, the method comprising steps of:
    applying a braze layer formed from a Nickel (Ni) alloy brazing material containing non-metallic constituents to the part;
    heating the brazing material to a first temperature above the liquidus temperature of the brazing material;
    maintaining the brazing material at the first temperature for a first period of time sufficient to allow the brazing material to liquefy and wick between into a braze joint;
    cooling the brazing material to a second temperature below the solidus temperature of the brazing material, at a controlled rate over a second period of time sufficient to prevent warping of the part due to thermal inertia;
    maintaining the brazing material at the second temperature for a third period of time sufficient to diffuse a portion of the non-metallic constituents away from a centerline area of the braze joint;
    heating the brazing material to a third temperature above the liquidus temperature of the brazing material at a controlled rate over a fourth period sufficient to prevent warping of the part due to thermal inertia, wherein the third temperature is below the first temperature;
    maintaining the brazing material at the third temperature for a fifth period of time sufficient to produce a centerline area of the braze joint substantially free of non-metallic constituents;
    cooling the brazing material to a fourth temperature above the solidus temperature of the brazing material and below the liquidus temperature at a controlled rate over a sixth period of time sufficient to prevent warping of the part due to thermal inertia.

2. The method of claim 1, wherein the nickel alloy brazing material is AMS 4777 brazing material.

3. The method of claim 1, wherein the first temperature is less than or equal to 1965° F. and greater than or equal to 1935° F.

4. The method of claim 3, wherein the second temperature is less than or equal to 1765° F. and greater than or equal to 1735° F.

5. The method of claim 4, wherein the third period of time is at least 60 minutes.

6. The method of claim 3, wherein the third temperature is less than 1940° F. and greater than 1910° F.

7. The method of claim 6, wherein heating the brazing material to the third temperature comprises heating the brazing material at the controlled rate of at least 30° per minute.

8. The method of claim 6, wherein the fifth period of time is at least 60 minutes.

* * * * *